United States Patent
Hsu et al.

(10) Patent No.: US 10,530,536 B2
(45) Date of Patent: Jan. 7, 2020

(54) RF SIGNAL PROCESSING APPARATUS

(71) Applicant: RICHWAVE TECHNOLOGY CORP., Taipei (TW)

(72) Inventors: Han-Tung Hsu, Taipei (TW); Wen-Cheng Chan, Taipei (TW)

(73) Assignee: RichWave Technology Corp., Taipei (TW)

( * ) Notice: Subject to any disclaimer, the term of this patent is extended or adjusted under 35 U.S.C. 154(b) by 0 days.

(21) Appl. No.: 15/958,497

(22) Filed: Apr. 20, 2018

(65) Prior Publication Data

US 2019/0207721 A1    Jul. 4, 2019

(30) Foreign Application Priority Data

Jan. 3, 2018  (TW) ............................ 107100196 A

(51) Int. Cl.
*G08C 25/02*   (2006.01)
*H04L 1/18*    (2006.01)
*G11B 20/10*   (2006.01)
*H04W 28/02*   (2009.01)

(52) U.S. Cl.
CPC ...... *H04L 1/1835* (2013.01); *G11B 20/10009* (2013.01); *H04W 28/0278* (2013.01)

(58) Field of Classification Search
CPC .... G06F 1/04; G06F 13/4059; H04W 52/028; Y02D 70/1226; Y02D 70/21; Y02D 70/1224; H04L 1/1835; H04L 1/005; H04L 1/0066; H04L 1/1854; H04L 1/16; H04L 1/1819; G11B 20/10009
See application file for complete search history.

(56) References Cited

U.S. PATENT DOCUMENTS

| | | | | |
|---|---|---|---|---|
| 5,065,398 A * | 11/1991 | Takashima | ............. | H04B 7/212 370/230 |
| 7,801,207 B2 * | 9/2010 | Chen | ....................... | H04B 1/40 375/229 |
| 2004/0190552 A1 * | 9/2004 | Kim | ....................... | H04L 1/005 370/469 |
| 2004/0223505 A1 * | 11/2004 | Kim | ....................... | H04L 47/14 370/412 |
| 2007/0025471 A1 * | 2/2007 | Chen | ................... | H04W 52/028 375/316 |
| 2009/0055677 A1 * | 2/2009 | Chen | ....................... | G06F 1/04 713/600 |

* cited by examiner

*Primary Examiner* — Guerrier Merant
(74) *Attorney, Agent, or Firm* — Winston Hsu

(57) ABSTRACT

The disclosure is related to an RF signal processing apparatus. The apparatus includes a processor and a buffer memory circuit. The apparatus includes a host interface for connecting with a host and an RF circuit for transmitting and receiving RF signals. The processor processes the RF signals to or from the RF circuit. The processor converts the received RF signals into data, or converts the data into the RF signals to be transmitted. The buffer memory circuit has a controller and two buffer memories. This memory architecture allows a system to assign a task to a first buffer memory and another task to a second buffer memory without restricting that the conventional buffer memory is limited to doing one task at a time. This memory architecture can solve inefficiency problems due to insufficient data transmission since the conventional buffer memory cannot be filled within a limited time period.

20 Claims, 13 Drawing Sheets

RF SIGNAL PROCESSING APPARATUS

CROSS REFERENCE TO RELATED APPLICATION

This application claims priority of Taiwan application No. 107100196, which was filed on Jan. 3, 2018, and is included herein by reference.

TECHNICAL FIELD

The disclosure discloses a signal processing device, and in particular to an RF signal processing apparatus with dual buffer memories capable of transmitting and receiving signals at the same time.

BACKGROUND

A conventional wireless transceiver includes a buffer memory that is used to buffer data that is ready to be transmitted or written. However, based on the restrictions conveyed by the conventional architecture of buffer memories, it is hard for a buffer memory to transmit and receive simultaneously. This may result in ineffective transmission due to the data throughput being limited when the buffer memory cannot be fully filled within a short period of time.

SUMMARY

According to one of the embodiments, the RF signal processing apparatus includes a processor and a buffer memory circuit. The processor is used to process radio-frequency signals received or transmitted by an RF circuit. The processor can digitize the received radio-frequency signals to a data, or convert the data to the radio-frequency signals to be transmitted. The buffer memory circuit electrically connected with the processor includes a controller, a first buffer memory and a second buffer memory. Further, the buffer memory circuit is electrically connected with a host interface.

The controller completely transmits a second data between the second buffer memory and the host interface within a first time slot. Further, the controller completely transmits a third data between the first buffer memory and the host interface within a second time slot. It is noted that each time slot is divided into a first proportional time and a second proportional time. The controller controls the first buffer memory to completely transmit a first data with the processor within the first proportional time of the first time slot. The controller also controls the second buffer memory to completely transmit the second data with the processor within the first proportional time of the second time slot.

In one further embodiment, the RF signal processing apparatus essentially includes a processor and a buffer memory circuit. The processor is used to process the radio-frequency signals received or transmitted by the RF circuit. The processor is used to process radio-frequency signals received or transmitted by an RF circuit, so as to digitize the received radio-frequency signals to a data, or to convert the data to the radio-frequency signals to be transmitted. The buffer memory circuit is electrically connected with the processor and a host interface. The buffer memory circuit includes a controller, a first buffer memory and a second buffer memory inside the apparatus.

The first buffer memory includes two buffers, and the second buffer memory also includes two buffers. The controller completes the second data transmission between one of the buffers of the second buffer memory and the host interface within a first time slot. The controller also completes the third data transmission between one of the buffers of the first buffer memory and the host interface within a second time slot. Each time slot is divided into a first proportional time and a second proportional time. The controller controls one of the two buffers of the first buffer memory to complete the first data transmission with the processor within a first proportional time of the first time slot. Further, the controller controls one of the two buffers of the second buffer memory to complete the second data transmission with the processor within the first proportional time of the second time slot.

DETAILED DESCRIPTION

The present invention will now be described more fully with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
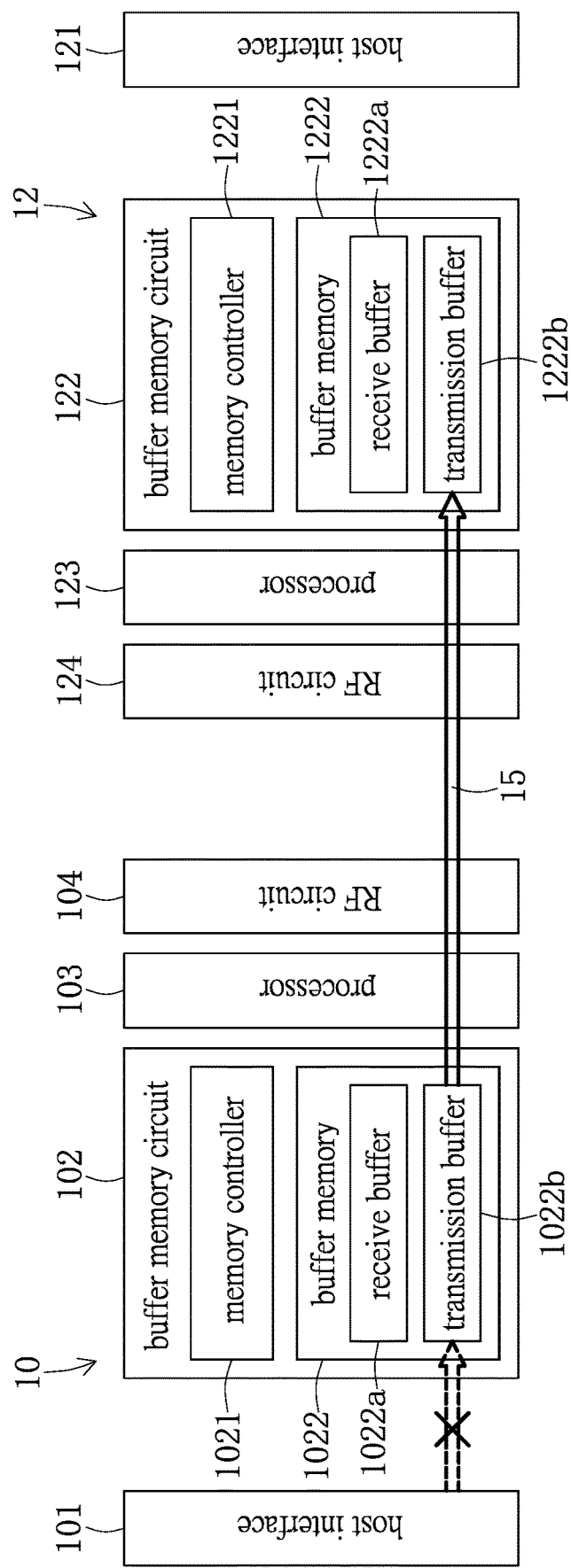
FIG. 1 shows a schematic diagram that depicts a data transmission process between RF signal processing apparatuses in one embodiment of the disclosure.
Figure 2:
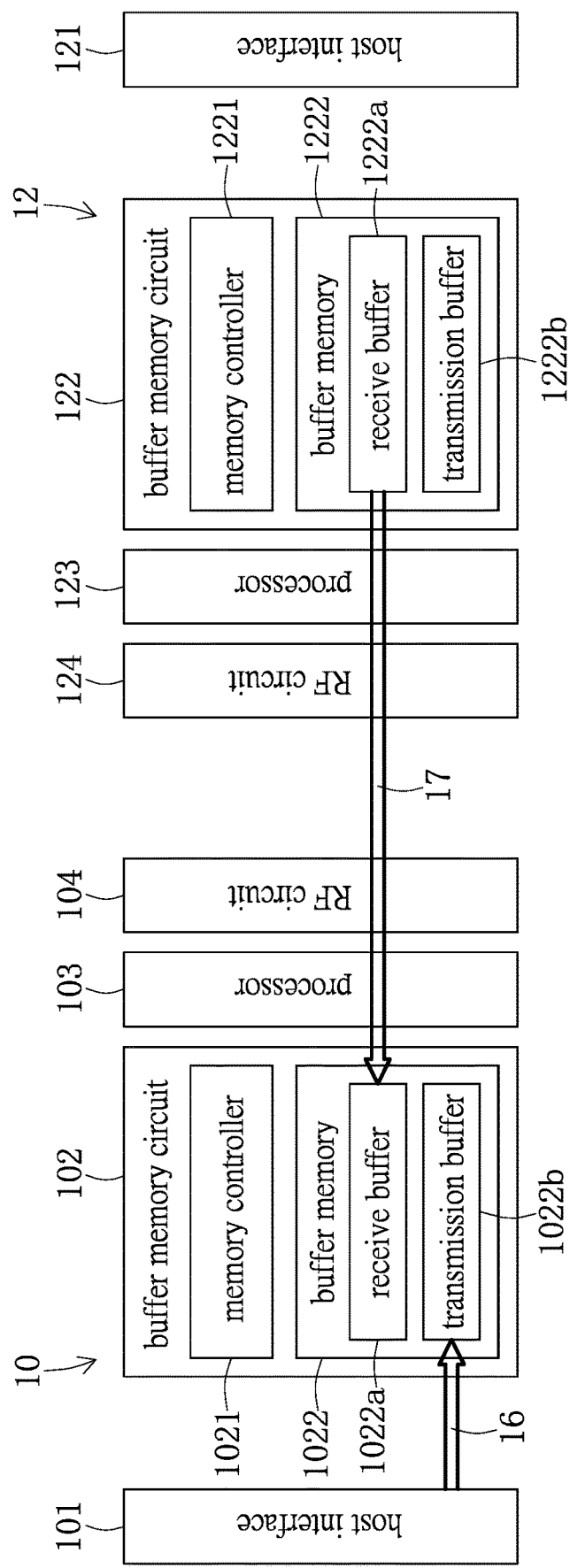
FIG. 2 shows another schematic diagram that depicts data transmission between the RF signal processing apparatuses.

The disclosure is related to an RF signal processing apparatus. FIG. 1 and FIG. 2 show a basic circuit diagram of the RF signal processing apparatus and describe a data transmission process between the apparatuses according to one embodiment of the disclosure. The RF signal processing apparatus is such as a wireless transceiver. The diagram schematically describes a transmitting and receiving process between two transceivers. The two transceivers act as a master device and a slave device, respectively.

For example, in the diagram, the left apparatus is a secondary transceiver 10 that is the slave device. The secondary transceiver 10 connects with an external host (not shown) via a host interface 101 to allow communication therebetween. The secondary transceiver 10 includes a buffer memory circuit 102 having a memory controller 1021 that is used to control operation of a buffer memory 1022. The buffer memory 1022 includes a receive buffer 1022a and a transmission buffer 1022b. The secondary transceiver 10 has a processor 103 that converts the data received from a host to radio-frequency signals which are transmitted by an RF circuit 104. Alternatively, the processor 103 converts the radio-frequency signals received from the RF circuit 104 into data. The data is temporarily stored in the buffer memory 1022 of the buffer memory circuit 102.

A primary transceiver 12 also includes similar hardware circuits. A host interface 121 is used to connect with an external host. The primary transceiver 12 includes a buffer memory circuit 122 that has a memory controller 1221 used to control operation of a buffer memory 1222. The buffer memory 1222 has a receive buffer 1222a and a transmission buffer 1222b. The primary transceiver 12 also includes a processor 123 and an RF circuit 124. The mentioned data refers to digitized data, and the radio-frequency signal is generally an analog signal.

The operations of the transceiver which transmits signals or receives signals are based on a system clock. A time slot can be defined based on the clock, and the time slot is divided into two periods for respectively operating the transmitting and receiving processes.

In an exemplary example, reference is made to FIG. 1, the first three quarters of one time slot are provided for the secondary transceiver 10 to transmit a first data 15 buffered in the transmission buffer 1022b of the buffer memory circuit 102 to the corresponding transmission buffer 1222b of the primary transceiver 12. During the transmission, the processor 103 of the secondary transceiver 10 converts the data to the radio-frequency signals that are transmitted to the primary transceiver 12 via the RF circuit 104. When the RF circuit 124 of the primary transceiver 12 receives the radio-frequency signals, the processor 123 converts the radio-frequency signals to digitized data. The data is buffered in the transmission buffer 1222b of the buffer memory 1222.

According to the embodiment described in FIG. 1 and FIG. 2, as compared with the conventional technology, the transceivers 10, 12 are already capable of operating the transmitting and receiving processes at the same time. However, the buffers (1022a, 1022b, 1222a, 1222b) of the buffer memories (1022, 1222) of the transceivers (10, 12) do not simultaneously operate the transmitting and receiving processes. Namely, while the first data 15 buffered in the transmission buffer 1022b is transmitted by the secondary transceiver 10, the transmission buffer 1022b does not receive any data written by any external host via the host interface 101.

In FIG. 2, in the last quarter of the time slot, the primary transceiver 12 transmits the third data 17 buffered in the receive buffer 1222a to the receive buffer 1022a of the secondary transceiver 10 through the processor 123 and the RF circuit 124. In the meantime, the secondary transceiver 10 can only operate the transmission buffer 1022b to receive the data, e.g. the second data 16, from a host.

The disclosure is also related to another RF signal processing apparatus that can be a transceiver of a wireless communication system. The main circuits of this RF signal processing apparatus are described in the schematic diagram of FIG. 3, where an RF signal processing apparatus 30 is provided. A buffer memory circuit 302 of the apparatus 30 includes dual buffer memories that are a first buffer memory 3021 and a second buffer memory 3022 respectively, and a controller 3020. The apparatus 30 has a processor 303 that is used to process the RF signals received or transmitted by an RF circuit 304. The processor 303 can be implemented by a processor (DSP) that is able to conduct conversion between analog and digital data. Namely, the processor 303 converts the radio-frequency signals to digitized data, or converts the data to the RF signals to be transmitted. The RF circuit 304 generally includes an antenna for transmitting or receiving signals, and the related signal conversion circuit. The apparatus 30 has a host interface 301 for connecting with an external host (not shown).

Rather than having one buffer in one buffer memory which cannot receive and transmit data at the same time, the apparatus 30 of the disclosure is configured with the dual buffer memories that are a first buffer memory 3021 and a second buffer memory 3022. The memories 3021 and 3022 respectively have their own transmission and receive buffers. The buffer memory circuit 302 is electrically connected with the processor 303. The buffer memory of the buffer memory circuit 302 is such as the first buffer memory 3021 having two buffers, e.g. a first receive buffer 3021a and a first transmission buffer 3021b. The two buffers can be configured to have the same or different storage capacities according to practical requirements. The memory 3022 includes a second receive buffer 3022a and a second transmission buffer 3022b. Similarly, the capacities of the buffers can be the same or different. The buffer memory circuit 302 is electrically connected with the host interface 301. The buffer memory circuit 302 receives data from the external host and also transmits the data to the external host via the host interface 301.

The controller 3020 acts as a memory controller for the whole apparatus. The major function of the controller 3020 is to manage and configure a transmission route and clock among the buffer memory of the buffer memory circuit 302, the processor 303 of the apparatus 30, and the host-end central processor. The controller 3020 defines a time slot for regulating timing of data transmission between the memory and an external device. The controller 3020 also manages the roles of the buffers of the first buffer memory 3021 and the second buffer memory 3022 in operation and the transmission directions. In one embodiment, every time slot can be divided into a first proportional time and a second proportional time. The length of the first proportional time is about three quarters of one time slot, while the length of the second proportional time is about one quarter of one time slot. The controller controls the data transmission between the buffer memory circuit and the processor within the second proportional time of a time slot to be in a direction opposite to the direction of the data transmission within the first proportional time of the same time slot.

Figure 3:
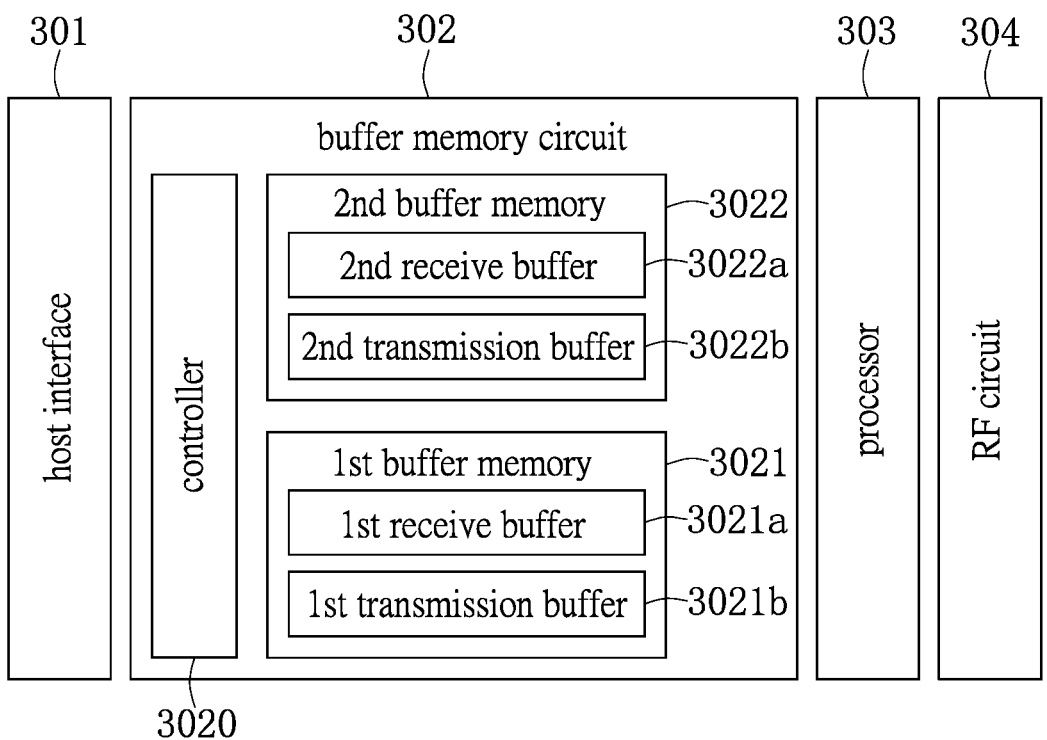
FIG. 3 shows a circuit diagram of the RF signal processing apparatus according to one embodiment of the disclosure.

Under the architecture with dual buffer memories in one apparatus, as shown in FIG. 3, the RF signal processing apparatus 30 can control one of the buffers to operate one task and the other buffer to operate another task. Namely, the apparatus 30 can respectively transmit and receive data through two buffers at the same time. Thus, this memory architecture can solve inefficiency problems due to insufficient data transmission since the conventional buffer memory cannot be filled within a limited time period.

Figure 4:
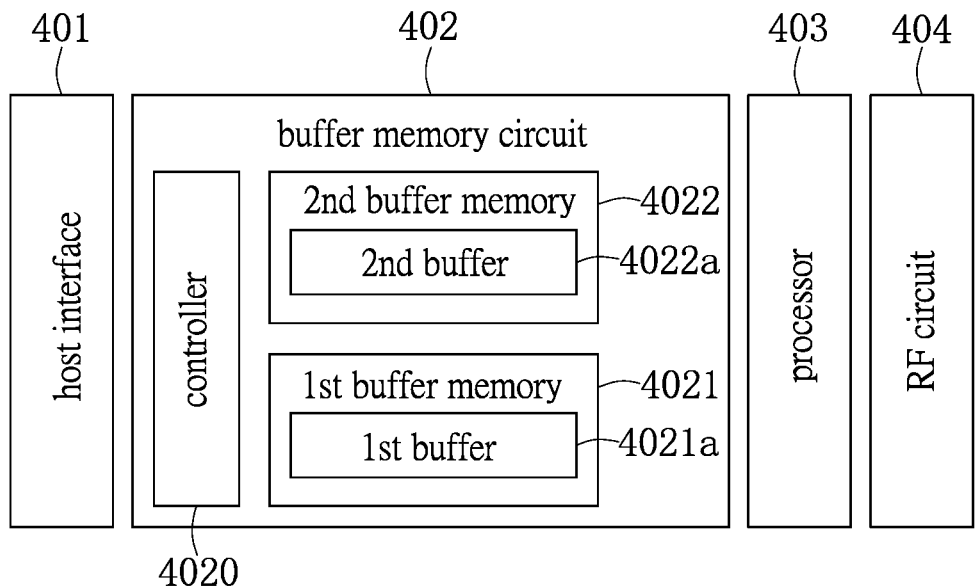
FIG. 4 shows another circuit diagram of the RF signal processing apparatus according to another embodiment of the disclosure.

FIG. 4 shows one further schematic diagram depicting the main circuits of the RF signal processing apparatus according to one further embodiment of the disclosure. The RF signal processing apparatus 40 has a simplified memory circuit such as a buffer memory circuit 402 having two buffer memories that are electrically connected with a processor 403 and a host interface 401. The apparatus 40 transmits data to an external host via the host interface 401. A processor 403 of the apparatus 40 processes the data, and an RF circuit 404 thereof is used to transmit and receive the RF signals.

The buffer memory circuit 402 is configured with a controller 4020 and two buffer memories that include a first buffer memory 4021 and a second buffer memory 4022. These two buffer memories 4021 and 4022 may be two independent memories that can respectively transmit and write data at the same time. Unlike the embodiment shown in FIG. 3, the first buffer memory 4021 or the second buffer memory 4022 of the current example only includes one buffer. This buffer may be a transmission buffer or a receive buffer, e.g. a first buffer 4021a or a second buffer 4022a. This architecture still allows the apparatus 40 to operate reading and writing data through two different buffer memories at the same time.

The controller 4020 controls operations of the buffers 4021a, 4022a of the memory 4021 and the memory 4022. For example, the controller 4020 can control the data transmitted between the second buffer 4022a and the host interface 401 to complete transmission within a first time slot. At the same time, the controller 4020 can control the first buffer 4021a to complete another data transmission with the processor 403 within the first proportional time of the first time slot. In a next time slot, e.g. the second time slot, the controller 4020 can control the data transmitted between the first buffer 4021a and the host interface 401 to complete transmission within a second time slot, and control the second buffer 4022a to meanwhile complete data transmission with the processor 403 in the first proportional time of the second time slot. The performance of data transmission of the system can be improved under this dual-buffer architecture without the limitations of the conventional memory circuit with one buffer that only performs one task at a time.

The system is preferably the RF signal processing apparatus with dual buffer memories. The RF signal processing apparatus is such as a wireless transceiver. The data transmission between two hosts is operated by two RF signal processing apparatuses that respectively act as a primary transceiver and a secondary transceiver in the hosts. The hosts are communicated through RF signals.

Figure 5:
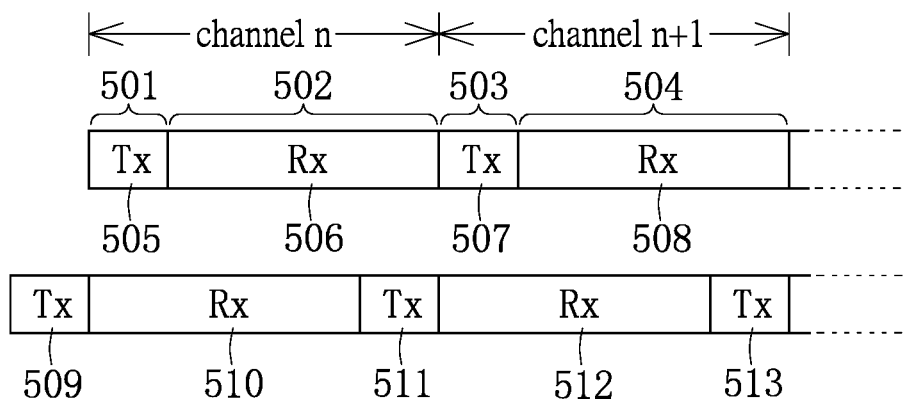
FIG. 5 shows a timing diagram of the RF signal processing apparatus that acts as a primary transceiver according to one embodiment of the disclosure.
Figure 6:
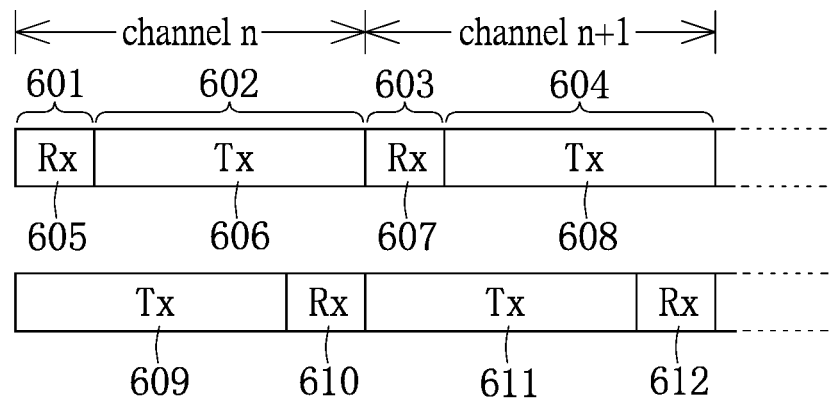
FIG. 6 shows another timing diagram of the RF signal processing apparatus that acts as a secondary transceiver in another embodiment of the disclosure.

FIG. 5 shows a timing diagram of operation of the RF signal processing apparatus that acts as a primary transceiver in one embodiment. Relatively, FIG. 6 shows another timing diagram of operation of the RF signal processing apparatus that acts as a secondary transceiver.

Reference is made to FIG. 5, where multiple time slots are set for accessing the buffers of the buffer memory circuit of the RF signal processing apparatus based on the system clock. The system accesses the buffers with the time slots sequentially through channels n, n+1, etc. . . .

The time slot of channel n is divided into a first proportional time 501 and a second proportional time 502. The time slot of channel n+1 is also divided into a first proportional time 503 and a second proportional time 504. For the buffer memory circuit with a first buffer and a second buffer, the controller controls the first buffer to receive the data (509) from an external host and send the data (505) out (Tx refers to transmitting data) within the first proportional time 501 according to a transmission command. For example, the data (505) is transmitted from the first buffer to the processor. In the second proportional time 502, the first buffer is changed to receive data (506) (Rx refers to receiving data). For example, the data (506) is transmitted from the processor to the first buffer. As in channel n+1, the data of the second buffer is transmitted within the first proportional time 503. For example, the data (507) is transmitted from the first buffer to the processor. The second buffer is changed to receive data (508) within the second proportional time 504 in channel n+1. For example, the data (508) has been transmitted from the processor to the second buffer.

At the host end, after the external host transmits data, it changes to receive data (510) from the second buffer in channel n. The external host then changes to write data (511) to the second buffer at the second half of the same time slot. In channel n+1, the external host receives data (512) from the first buffer of the RF signal processing apparatus, and then transmits data (513) to the first buffer. The above embodiment shows the access timing for the memory of the primary transceiver.

Reference is made to FIG. 6, showing the timing diagram of the secondary transceiver. While accessing the memory of the secondary transceiver, the time is divided into multiple time slots based on the system clock. The buffers are accessed with the time slots through the channels n, n+1 . . . .

In channel n, the time slot is divided into a first proportional time 601 and a second proportional time 602. The controller of the buffer memory circuit controls the first buffer to receive data (605) within a first proportional time 601. The first buffer is changed to transmit data (606) within the second proportional time 602. Correspondingly, the external host transmits data (609) to the first buffer within a first half of the time slot in channel n. The external host then receives data (610) from the first buffer within the second half of the time slot in channel n.

In channel n+1, the controller controls the second buffer to receive data (607) within the first proportional time 603, and conversely transmit the data (608) out of the second buffer within the second proportional time 604. In the meantime, the host transmits data (611) to the second buffer within the first half of the time slot in channel n+1, and then receives data (612) from the second buffer within the second half of the time slot.

The operating mechanism of the buffer memory circuit with dual buffers of the RF signal processing apparatus teaches that the first time slot and the second time slot are two consecutive time slots. This operating mechanism causes the memory controller to control the buffer memory circuit to complete the data transmission with the host interface within every time slot, and to control the buffer memory of the buffer memory circuit to complete data transmission with the processor within the first proportional time of every time slot. On the other hand, the controller controls the data transmission between the buffer memory circuit and the processor within the second proportional time of a time slot in a direction opposite to the direction of the data transmission within the first proportional time of the same time slot.

Figure 7:
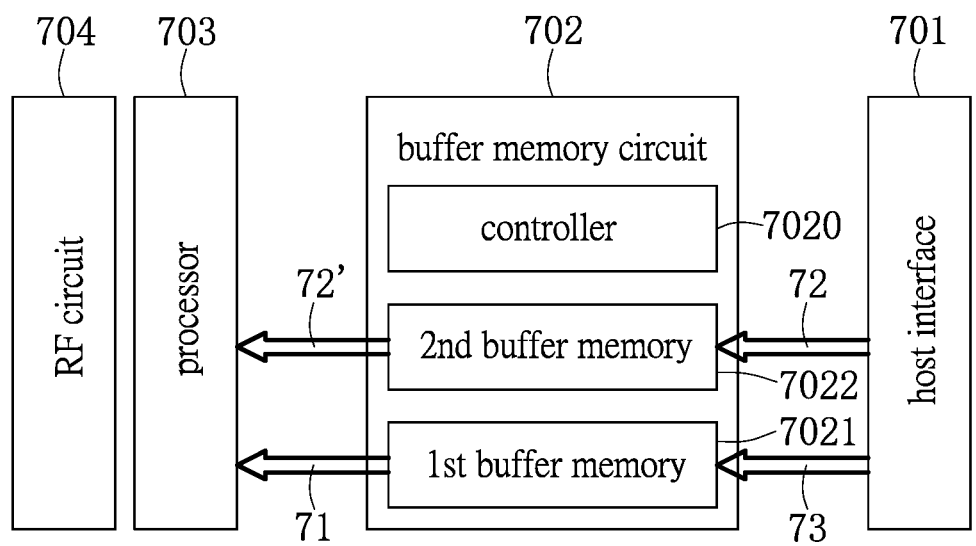
FIG. 7 shows a schematic diagram that depicts data transmission between an external element and two buffer memories of the RF signal processing apparatus in one embodiment of the disclosure.

FIG. 7 shows a schematic diagram illustrating the data transmission between the two buffer memories of the RF signal processing apparatus and an external element at different times with an architecture similar to those in the above embodiments. An RF signal processing apparatus 70 includes a host interface 701, a buffer memory circuit 702, a processor 703 and an RF circuit 704. The buffer memory circuit 702 has a controller 7020 and two buffer memories that are a first buffer memory 7021 and a second buffer memory 7022 respectively. While the apparatus 70 is in operation, it can complete data transmission with the external element within different proportional times in the same time slot or in different time slots.

According to the access mechanism described above, the controller 7020 controls the buffer memories 7021 and 7022 of the buffer memory circuit 702 to complete data transmission with the host interface 701 within every time slot, and also completes data transmission with the processor 703 within the first proportional time of every time slot. Further, the controller 7020 controls the buffer memories 7021, 7022 to conduct data transmission with the processor 703 within the section proportional time of the time slot in a direction opposite to the data transmission within the first proportional time of the same time slot.

In the present example, a first data 71 is transmitted from a first buffer memory 7021 to the processor 703 within a first proportional time of a first time slot. In the meantime, the second buffer memory 7022 receives a second data 72 from the host interface 701 within the first time slot. Thus, the RF signal processing apparatus utilizes the first buffer memory 7021 and the second buffer memory 7022 to conduct transmission/read and receive/write actions to the memory simultaneously. Next, when the time enters a second time slot, the controller 7020 controls the second buffer memory 7022 to transmit the second data 72' that is received from the buffer to the processor 703 within a first proportional time of the second time slot. In the meantime, the controller 7020 controls the first buffer memory 7021 to receive a third data 73 from the host interface 701. Thus, the apparatus 70 conducts both transmitting and receiving operations through the dual buffer memories 7021 and 7022 within the second time slot.

First Embodiment

Figure 8:
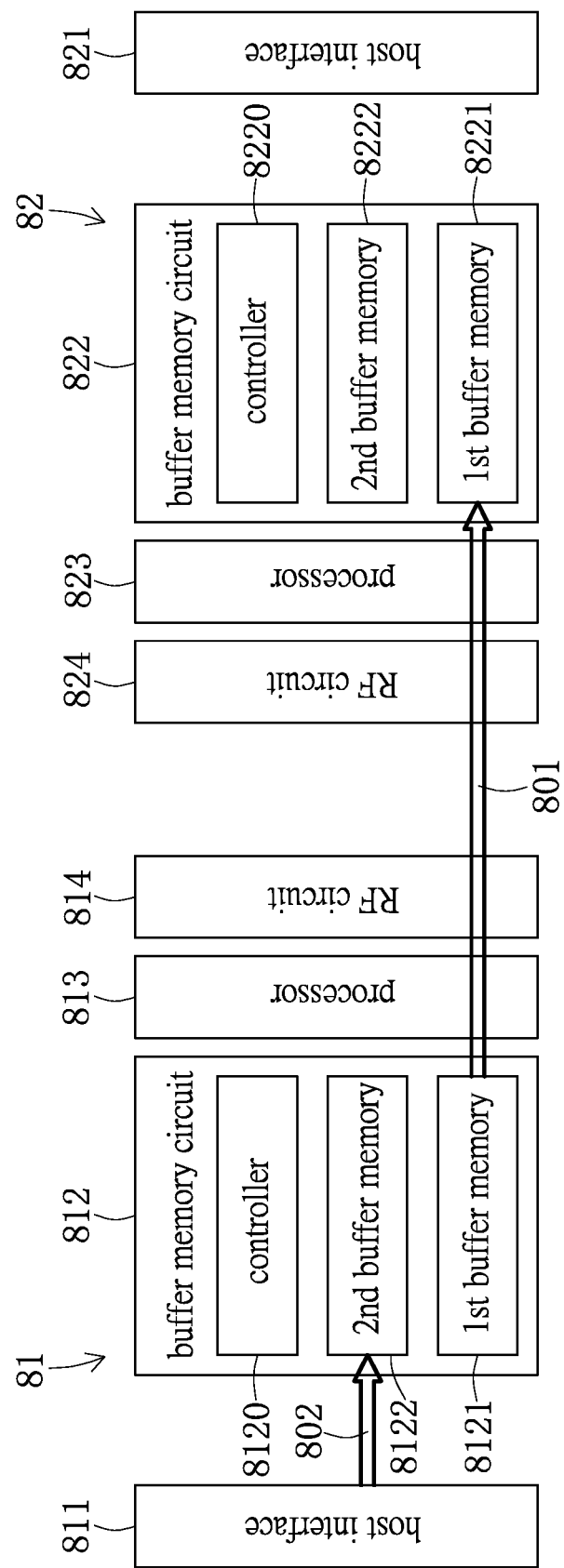
FIG. 8 shows a schematic diagram describing data transmission process between the RF signal processing apparatuses according to a first embodiment of the disclosure.

FIG. 8 shows a schematic diagram illustrating data transmission between two RF signal processing apparatuses at different ends in one embodiment of the disclosure. The diagram shows a communication system that provides a first RF signal processing apparatus 81 acting as a secondary transceiver and having a buffer memory circuit 812. The apparatus 81 communicates with an external host (not shown) via a host interface 811. A processor 813 of the apparatus 81 conducts an ADC/DAC signal conversion. The apparatus 81 receives or transmits RF signals through an RF circuit 814 and by which communicates with a second RF signal processing apparatus 82. The apparatus 82 acts as a primary transceiver of the system. The apparatus 82 includes circuits such as a host interface 821, a buffer memory circuit 822, a processor 823 and an RF circuit 824. The primary transceiver pairs with the secondary transceiver for two-way communication. The applications of the system are not limited by the roles, e.g. the primary and secondary, of the RF signal processing apparatuses.

In one embodiment of the disclosure, referring to the architecture disclosed in FIG. 4, the first and second RF signal processing apparatuses 81 and 82 conduct data transmission with the external device according to the timing and the operating mechanism of the buffer memory. The buffer memory circuits (812, 822) of the first and second RF signal processing apparatuses (81, 82) respectively include controllers (8120, 8220), and each includes two buffer memories (8121, 8122/8221, 8222). Each buffer memory includes two buffers for reading and writing data.

The apparatus 81 firstly establishes a connection between the host interface 811 and the external host. The controller 8120 controls the second buffer memory 8122, e.g. a transmission buffer or a receive buffer, to receive the second data 802 via the host interface 811 within the first time slot. When connected to the apparatus 82, the controller 8120 controls the first buffer memory 8121, e.g. a transmission buffer or a receive buffer, to receive the first data 801 within the first three quarters of the first time slot. The processor 813 converts the first data 801 to radio-frequency signals that are transmitted to the first buffer memory 8221 of the apparatus 82 via the RF circuit 814. The apparatus 82 receives this first data 801 via its RF circuit 824. The processor 823 converts the first data 801 into digital signals. By the controller 8220, the digital signals are stored in a corresponding first buffer memory 8221.

Both the first and second RF signal processing apparatuses 81 and 82 have two buffer memories 8121, 8122, 8221 and 8222 that can process transmission and receive procedures at the same time. Therefore, the memory is not limited to being only capable of transmitting or receiving data at a time since the apparatus 81 permits all or a first part of the second data 802 to be written to its own buffer memory when the apparatus 81 is transmitting the first data 81 to the apparatus 82.

Figure 9:
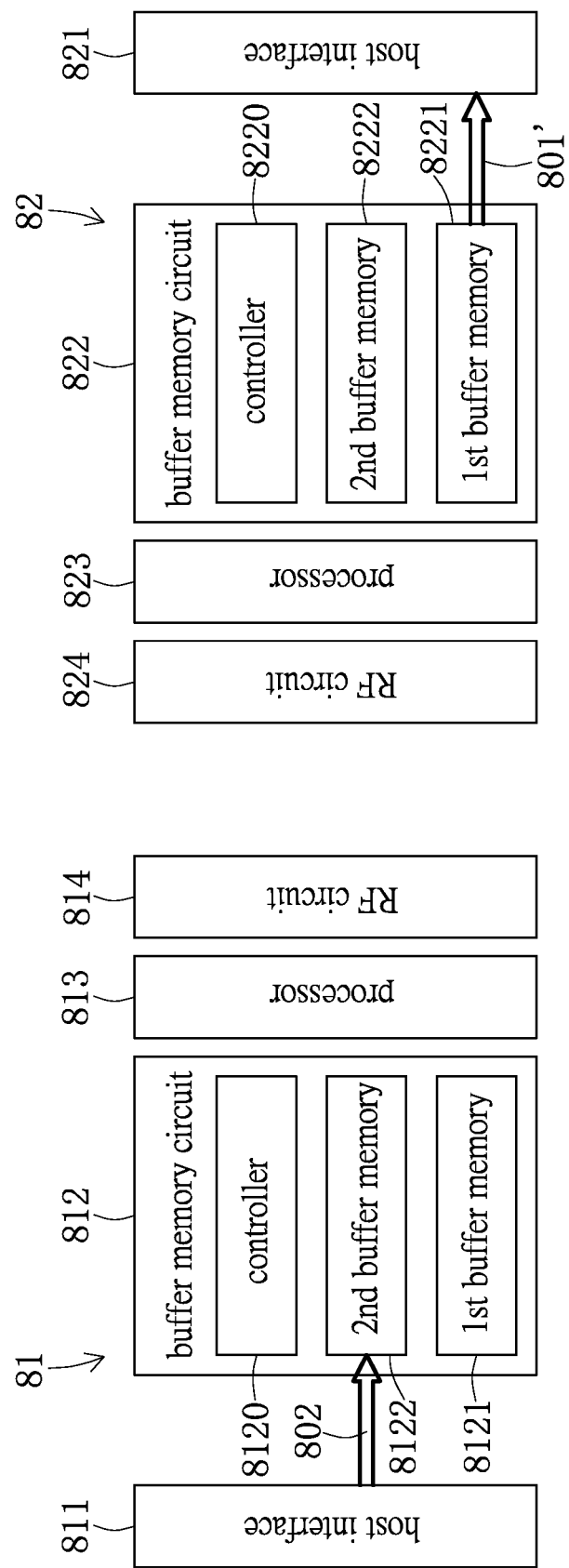
FIG. 9 shows another schematic diagram describing data transmission process between the RF signal processing apparatuses according to the first embodiment.

Reference is next made to FIG. 9 showing a transmission mechanism implemented by a dual-buffer architecture RF signal processing apparatus. Accordingly, the second data 802 should be completely transmitted between the second buffer memory 8122 of the first RF signal processing apparatus 81 and the host interface 811 within the first time slot. Therefore, the second part of the second data 802 should be transmitted completely within this period of time.

In FIG. 8, the first buffer memory 8221 of the second RF signal processing apparatus 82 has received the first data 801 within the first proportional time of the first time slot. In principal, the direction of data transmission within the second proportional time of the first time slot is opposite to the direction of data transmission within the first proportional time of the first time slot. The controller 8220 shown in FIG. 9 of the buffer memory circuit 822 of the apparatus 82 controls the memory 8221 to transmit the first data 801' to the external host via the host interface 821. This means the first buffer memory 8221 of the apparatus 82 has completed the writing and reading process of the first data 801' within the first time slot. However, if the external host does not complete accessing the first data 801' within the second proportional time of the first time slot, the external host goes on to access the first data 801' until the first data 801' has been accessed within the first proportional time of the second time slot.

Figure 10:
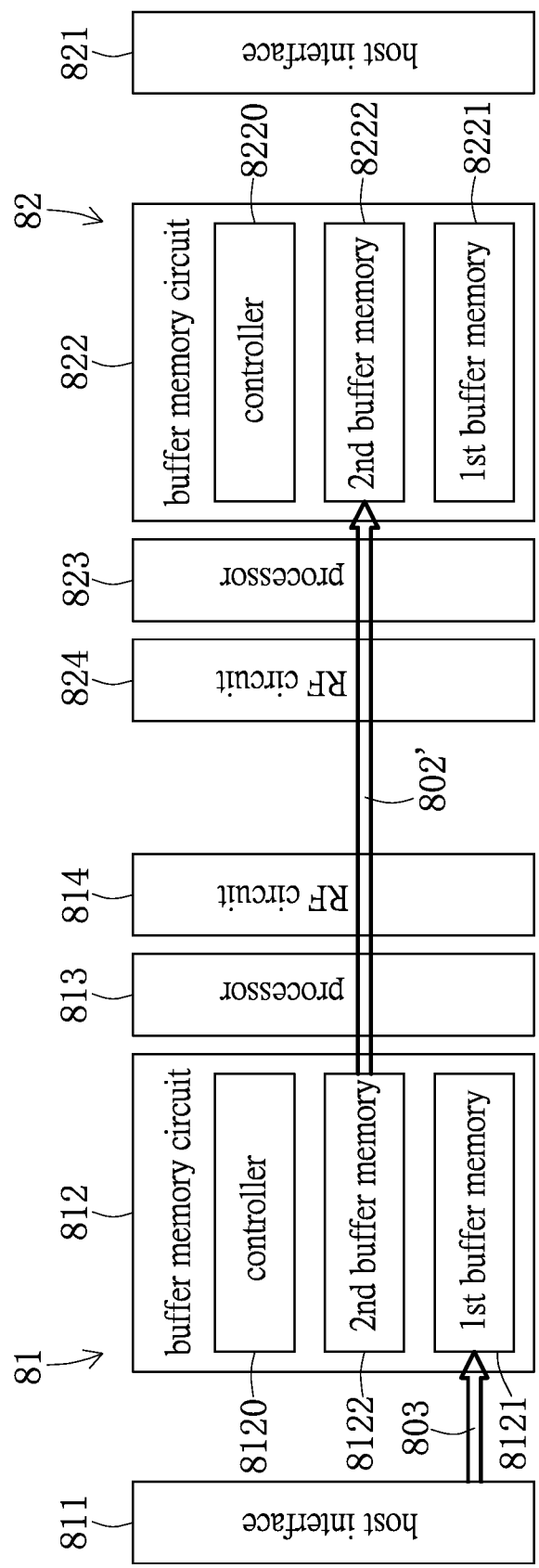
FIG. 10 shows one further schematic diagram describing data transmission process between the RF signal processing apparatuses according to the first embodiment.

FIG. 10 shows another schematic diagram illustrating data transmission between the two RF signal processing apparatuses in one embodiment of the disclosure. In the second time slot, similar to the example shown in FIG. 8, the roles of the first buffer memory 8121 and the second buffer memory 8122 of the apparatus 81 are exchanged. The controller 8120 of the buffer memory circuit 812 of the apparatus 81 controls the second buffer memory 8122 to transmit the second data 802' to the apparatus 82 through the processor 813 and the RF circuit 814 within the first proportional time of the second time slot. It is noted that the second data 802' is completely transmitted within this first proportional time.

In the present example, when the controller 8120 controls the transmission of the second data 802', the controller 8120 simultaneously permits the first buffer memory 8121 to conduct data transmission with an external host, i.e., controlling the first buffer memory 8121 to transmit a third data 803 with the host interface 811. At this time, only a first part of the third data 803 may be transmitted. According to the transmission mechanism, the entire third data 803 including the first part and a second part should be completely transmitted within the second time slot. In the present example, the third data 803 is written to the first buffer memory 8121 of the buffer memory circuit 812 of the apparatus 81 from an external host (not shown) via the host interface 811.

Figure 11:
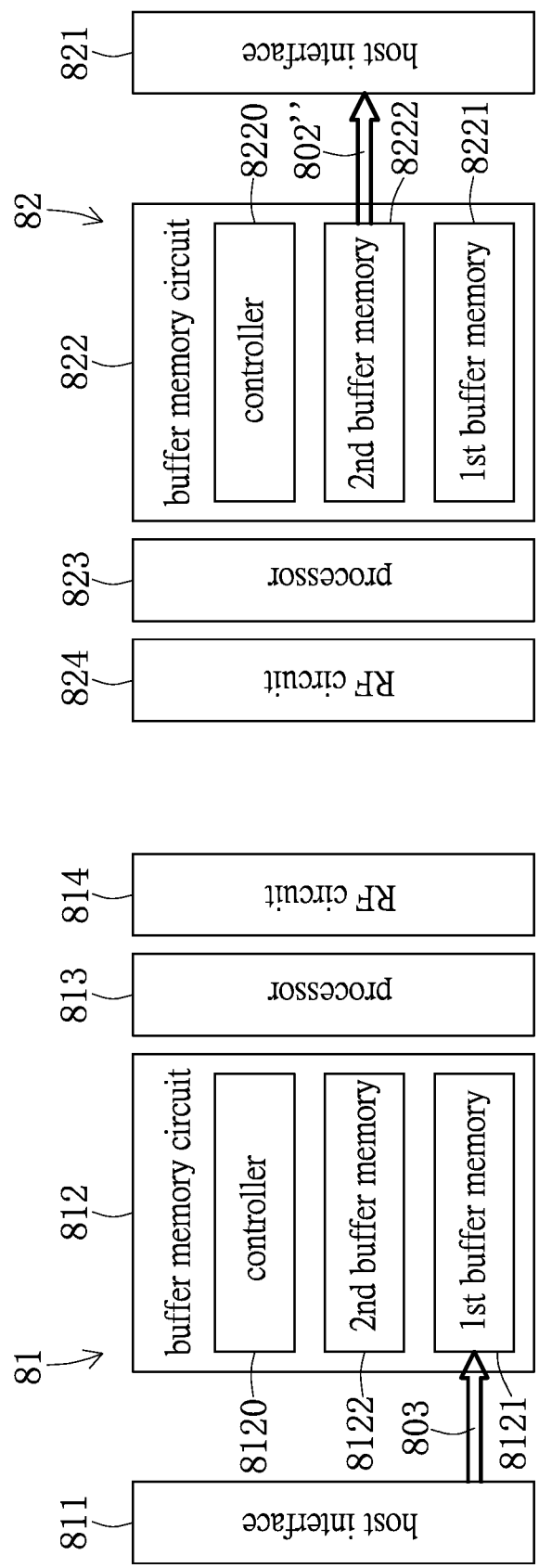
FIG. 11 shows one more schematic diagram describing data transmission process between the RF signal processing apparatuses according to the first embodiment.

In FIG. 11, the mentioned second part of the third data 803 should be written to the first buffer memory 8121 of the buffer memory circuit 812 of the first apparatus 81 completely within the second proportional time of the second time slot. The controller 8120 should then confirm that the third data 803 has been transmitted, for example to the processor 813, within a next time slot, e.g. a third time slot. It is noted that when the data, e.g. the third data 803, has been written to the buffer memory, and the data can be transmitted at the next time slot. In the meantime, referring to the example shown in FIG. 10, the second data 802' is transmitted to the corresponding second buffer memory 8222 of the apparatus 82 from the second buffer memory 8122 of the apparatus 81 within the first proportional time. The controller 8220 of the buffer memory circuit 822 of the apparatus 82 controls the memory 8222 to transmit the second data 802" to the host interface 821 within the second proportional time of the second time slot.

According to the above embodiments, during the second proportional time of the first time slot or the second time slot, both the first and second RF signal processing apparatuses 81 and 82 process transmission of the second data 802 (FIG. 9) or the third data 803 (FIG. 11) with their host interfaces 811 and 821. In the meantime, the first and second RF signal processing apparatuses 81 and 82 permit the external host to continuously access data in the buffer memory, e.g. write or read data into the buffer memory, via the host interfaces 811 and 821 until the data has been completely written. Accordingly, if the third data 803 has been transmitted completely between one of the buffers of the first buffer memory 8121 and the host interface 811 within the first proportional time of the second time slot, the other buffer of the first buffer memory 8121 accepts the external host to read or write data via the host interface 811.

According to the embodiments shown in FIG. 8 through FIG. 11, the data can be completely transmitted within the same time slot, e.g. the first time slot or the second time slot. Therefore, the RF signal processing apparatus (81, 82) with the dual buffer memories of the present disclosure can process both transmitting/read and receiving/write operations at the same time.

It should be noted that the buffer memory circuit (812, 822) of the first or second RF signal processing apparatus (81, 82) can be implemented by a transmission buffer or a receive buffer.

Second Embodiment

The second embodiment refers to the hardware architecture illustrated in FIG. 3. The RF signal processing apparatus 30 includes the host interface 301 connected to an external host, the buffer memory circuit 302 including a controller 3020 for controlling operation of the memory, a first buffer memory 3021 and a second buffer memory 3022, a processor 303 for processing data, an RF circuit 304 for operating RF signal transmission and an antenna unit (not shown). The memory 3021 can be divided into a first receive buffer 3021a and a first transmission buffer 3021b based on their functionalities. The memory 3022 includes a second receive buffer 3022a and a second transmission buffer 3022b. Both the buffer memories 3021 and 3022 can be physically independent memory blocks. The receive and transmission buffers 3021a, 3021b, 3022a and 3022b are configured to be logical buffers allocated from the memory block.

Figure 12:
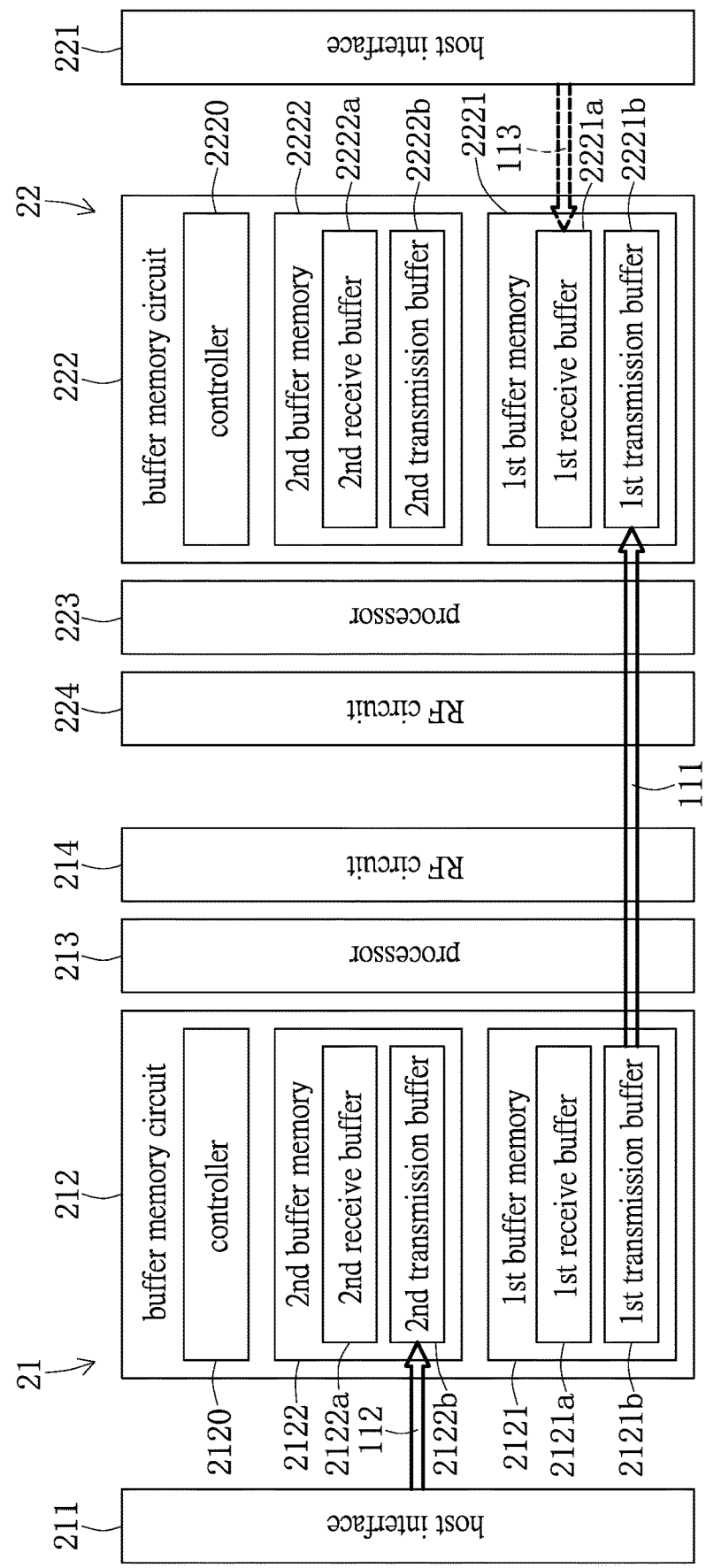
FIG. 12 shows a schematic diagram describing data transmission process between the RF signal processing apparatuses according to a second embodiment of the disclosure.

According to the embodiment described in FIG. 12, a first RF signal processing apparatus 21 acts as a secondary transceiver of the system and a second RF signal processing apparatus 22 acts as a primary transceiver. The apparatus 21 is configured with a host interface 211, a buffer memory circuit 212, a processor 213 and an RF circuit 214. The buffer memory circuit 212 includes a controller 2120, a first buffer memory 2121 and a second buffer memory 2122. The memory 2121 includes a first receive buffer 2121a and a first transmission buffer 2121b. The second buffer memory 2122 includes a second receive buffer 2122a and a second transmission buffer 2122b. The apparatus 22 is configured with a host interface 221, a buffer memory circuit 222, a processor 223 and an RF circuit 224. The buffer memory circuit 222 includes a controller 2220, a first buffer memory 2221 and a second buffer memory 2222. The memory 2221 has a first receive buffer 2221a and a first transmission buffer 2221b. The memory 2222 has a second receive buffer 2222a and a second transmission buffer 2222b.

In process of data transmission according to one of the embodiments, the first buffer memory and the second buffer memory of the buffer memory circuit of the RF signal processing apparatus respectively conduct the transmitting and receiving steps. The time slot for operating the data transmission is divided into a first proportional time, e.g. the first three quarters of the time slot, and a second proportional time, e.g. the last quarter of the time slot time.

As the system starts to operate, the controller 2120 of the buffer memory circuit 212 of the apparatus 21 controls the buffer 2121b to transmit the first data 111 to the buffer 2221b of the buffer memory circuit 222 of the apparatus 22 through the processor 213 and the RF circuit 214 within the first proportional time of the first time slot. In the meantime, the apparatus 21 permits the second transmission buffer 2122b of the second buffer memory 2122 to receive the second data 112 to be written to the second transmission buffer 2122b via the host interface 211 from an external host.

In the present embodiment of the disclosure, the controller 2120 of the buffer memory circuit 212 of the apparatus 21 controls the second transmission buffer 2122b to completely transmit the second data 112 with the host interface 211 within the first time slot. During this first time slot, the controller 2220 of the buffer memory circuit 222 of the apparatus 22 controls the first receive buffer 2221a to completely transmit the third data 113 with the host interface 221.

Under this architecture of memory, one buffer of a buffer memory, e.g. the first buffer memory 2121, can be configured to receive and transmit the data at the same time. The other buffer of the other buffer memory, e.g. the second buffer memory 2122, is provided in the memory to be written with the data during the operation of the buffer of the first buffer memory. It should be noted that, when the external host requests access to the apparatus 21 via the host interface 211, the apparatus 21 will not permit this request until the previous data has been read and written completely since it is not possible to simultaneously process reading and writing operations between the host interface and the buffer memory circuit.

Figure 13:
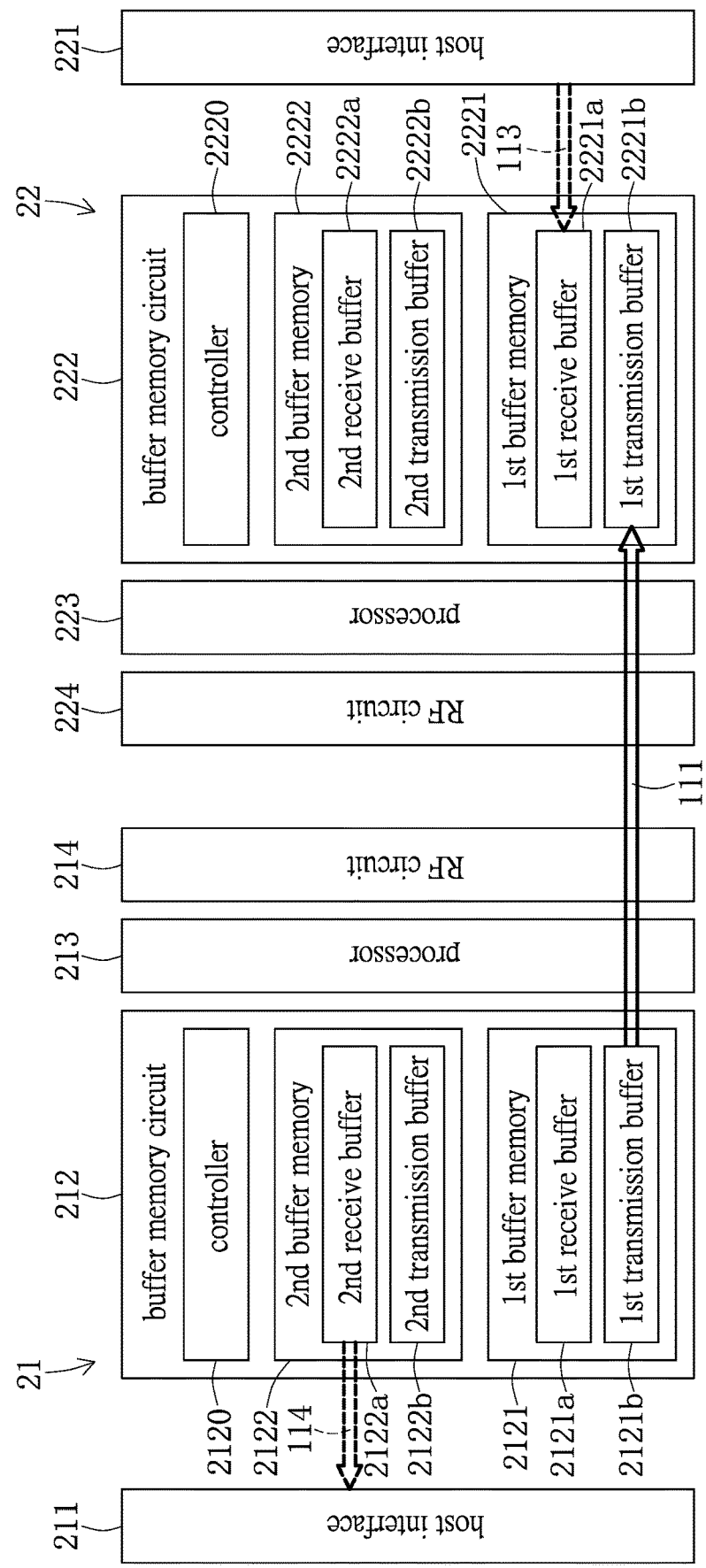
FIG. 13 shows another schematic diagram describing data transmission process between the RF signal processing apparatuses according to the second embodiment.

Reference is made to FIG. 13, which shows the first RF signal processing apparatus 21 of FIG. 12 having written the second data 112 to the buffer 2122b within the first proportional time of the first time slot. However, if the first data 111 is still in transmission when the second data 112 is written to the buffer 2122b, the external host can start to read the fourth data 114 buffered in the buffer 2122a via the host interface 211. According to the data transmission mechanism, the fourth data 114 could be read completely within one full time slot including the first proportional time and the second proportional time in one embodiment. In another embodiment, the fourth data 114 could be read completely within second time slot.

Figure 14:
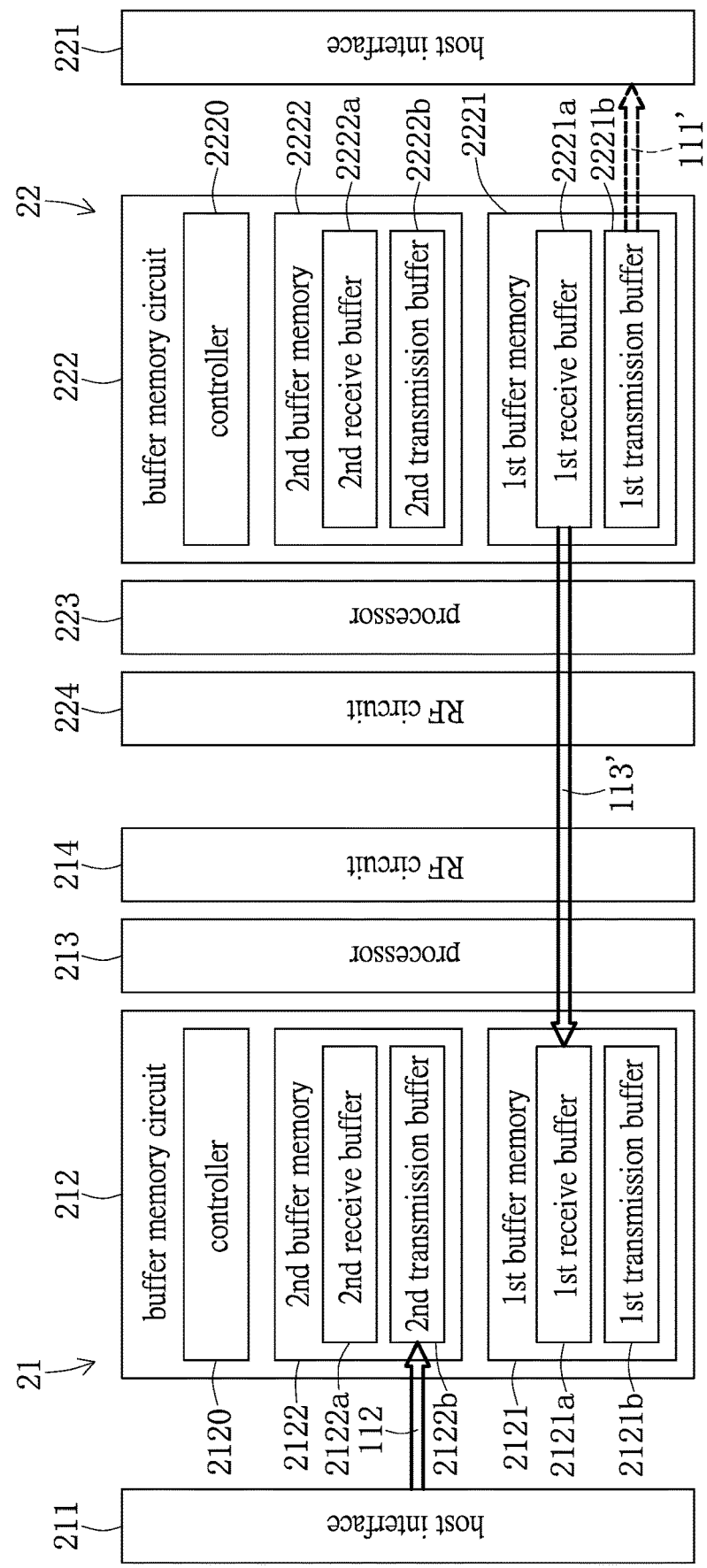
FIG. 14 shows one further schematic diagram describing data transmission process between the RF signal processing apparatuses according to the second embodiment.

FIG. 14 shows another embodiment of the operation of the system during the first time slot illustrated in FIG. 12. The first data 111 has been transmitted within the second proportional time of the first time slot. The external host connected with the second RF signal processing apparatus 22 can already read the first data 111' buffered in the first transmission buffer 2221b via the host interface 221. In one embodiment, the first data 111' could be read completely by the external host within the second time slot, or within the first proportional time of the second time slot.

Within the second proportional time of the first time slot, the second RF signal processing apparatus 22 can transmit the third data 113' previously written in the first receive buffer 2221a of the buffer memory circuit 222 to the corresponding first receive buffer 2121a of the apparatus 21. In the meantime, the second data 112 is still written to the second transmission buffer 2122b of the buffer memory circuit 212 of the apparatus 21 until it is completely written.

According to the second embodiment of the disclosure, one of the two buffers, e.g. the receive and transmission buffers, is utilized to process the data transmission between the two RF signal processing apparatuses (21, 22) or between one of the apparatuses and a host. The roles of the buffers of the buffer memory can be exchanged in actual operation.

According to one embodiment of the disclosure, the data transmitted between one of the buffers of the buffer memory and the host interface within a time slot, will be transmitted to another RF signal processing apparatus through the processor within a next time slot.

Figure 15:
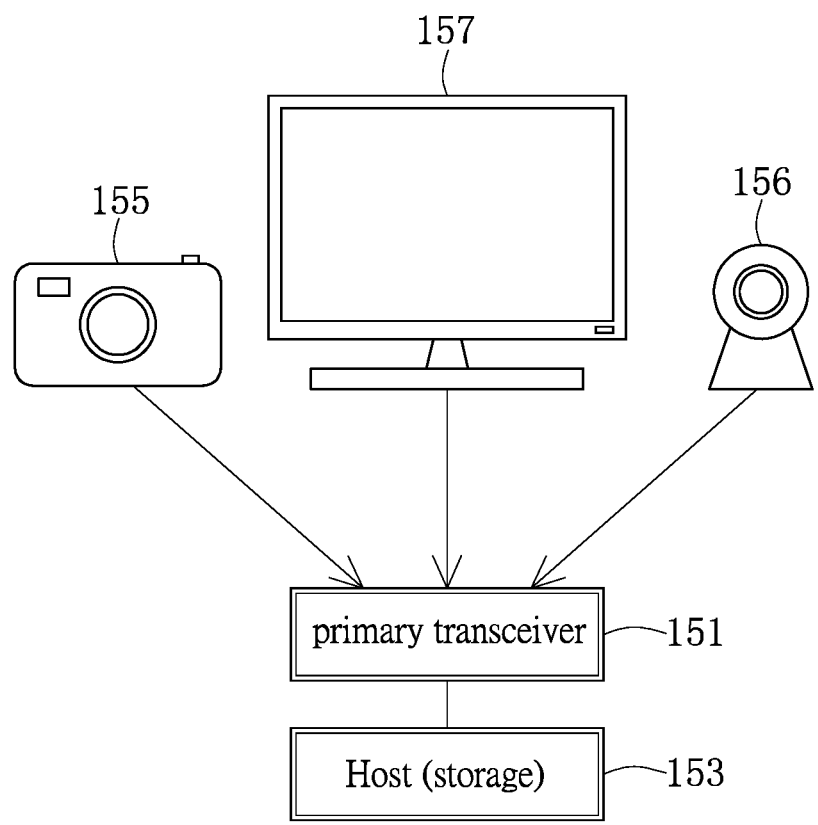
FIG. 15 schematically shows an application of the second RF signal processing apparatus that acts as a primary or secondary transceiver according to one embodiment of the disclosure.

The second RF signal processing apparatus is exemplified in the embodiments as acting as a primary transceiver in a communication system, and the first RF signal processing apparatus acts as a secondary transceiver. Reference is made to FIG. 15, in which a host 153 is included in the communication system. The host 153 can generally act as a storage that can transmit data via the host interface electrically connected with the primary transceiver 151 to the secondary transceivers (155, 156 and 157). The host 153 can be an electronic device such as a camera 155, a video recorder 156 and a TV 157 rendering the digital content that may be disposed with the secondary transceiver and that generate a huge amount of video data. The architecture of the RF signal processing apparatus with dual buffer memories provides a high capability of data transmission and effectively reduces the need of high transmission clock of a serial peripheral interface (SPI) adopted by a general computer.

In sum, the RF signal processing apparatus of the disclosure can solve the general limitation that a memory with one buffer can only either read or write the data at a time. The RF signal processing apparatus is configured with a first buffer memory and a second buffer memory that are physically independent. Through a controller of the apparatus, a first transmission buffer or a first receive buffer of a first buffer memory and a second transmission buffer or a second receive buffer of a second buffer memory can operate at the same time. This memory architecture can solve inefficiency problems due to insufficient data transmission since the conventional buffer memory cannot be filled within a limited time period.

It is also worth noting that the two proportional times of one time slot are correlated with the transmission time of the buffer memory circuit and the processor of the apparatus. When one of the buffers is filled with data or clear of data, the host is allowed to read or write data to the buffer. However, the data may not simultaneously be read and written between the host and the RF signal processing apparatus. Furthermore, the timing to read or write data between the host and the buffer memory circuit may have no specific relationship with the mentioned proportional times divided from one time slot.

It is intended that the specification and depicted embodiments be considered exemplary only, with a true scope of the invention being determined by the broad meaning of the following claims.

What is claimed is:

1. An RF signal processing apparatus, comprising:
   a processor, used to process radio-frequency signals received or transmitted by an RF circuit, and to digitize the received radio-frequency signals to a data, or to convert the data to the radio-frequency signals to be transmitted; and
   a buffer memory circuit, electrically connected with the processor, including a controller, a first buffer memory and a second buffer memory, wherein the buffer memory circuit is electrically connected with a host interface;
   wherein, the controller is used to completely transmit a second data between the second buffer memory and the host interface within a first time slot, and completely transmit a third data between the first buffer memory and the host interface within a second time slot; each time slot is divided into a first proportional time and a second proportional time;
   wherein, the controller controls the first buffer memory to completely transmit a first data with the processor within the first proportional time of the first time slot; and the controller controls the second buffer memory to completely transmit the second data with the processor within the first proportional time of the second time slot.

2. The apparatus according to claim 1, wherein the first time slot and the second time slot are two consecutive time slots; the controller controls the buffer memory circuit to complete data transmission with the host interface within every time slot; the controller controls the buffer memory circuit to complete data transmission with the processor within the first proportional time of every time slot.

3. The apparatus according claim 2, wherein the controller controls the data transmission between the buffer memory circuit and the processor within the second proportional time of a time slot in a direction opposite to the direction of the data transmission within the first proportional time of the same time slot.

4. The apparatus according to claim 2, wherein the controller completes the transmission of the second data between the second buffer memory and the host interface within the second proportional time of the first time slot; at the same time, the controller of another RF signal processing apparatus controls its first buffer memory to start the first data transmission with its host interface.

5. The apparatus according to claim 4, wherein the controller completes the second data transmission between the second buffer memory and the processor within the first proportional time of the second time slot; at the same time, the controller controls the first buffer memory to start the third data transmission with the host interface.

6. The apparatus according to claim 4, wherein the controller completes the third data transmission within the second proportional time of the second time slot; at the same time, the controller of another RF signal processing apparatus controls its second buffer memory to start the second data transmission with its host interface.

7. The apparatus according to claim 1, wherein the first buffer memory includes a first receive buffer or a first transmission buffer; the second buffer memory includes a second receive buffer or a second transmission buffer.

8. An RF signal processing apparatus, comprising:
a processor, used to process radio-frequency signals received or transmitted by an RF circuit, and to digitize the received radio-frequency signals to a data, or to convert the data to the radio-frequency signals to be transmitted; and
a buffer memory circuit, electrically connected with the processor, including a controller, a first buffer memory and a second buffer memory, wherein the buffer memory circuit is electrically connected with a host interface, the first buffer memory includes two buffers, and the second buffer memory includes another two buffers;
wherein, the controller is used to completely transmit a second data between one of the buffers of the second buffer memory and the host interface within a first time slot, and completely transmit a third data between one of the buffers of the first buffer memory and the host interface within a second time slot; each time slot is divided into a first proportional time and a second proportional time;
wherein, the controller controls one of the buffers of the first buffer memory to completely transmit a first data with the processor within the first proportional time of the first time slot; and the controller controls one of the buffers of the second buffer memory to completely transmit the second data with the processor within the first proportional time of the second time slot.

9. The apparatus according to claim 8, wherein the two buffers of the first buffer memory are a first receive buffer and a first transmission buffer; the two buffers of the second buffer memory are a second receive buffer and a second transmission buffer.

10. The apparatus according to claim 8, wherein the first time slot and the second time slot are two consecutive time slots; the controller controls the buffer memory circuit to complete data transmission with the host interface within every time slot; the controller controls the buffer memory circuit to complete data transmission with the processor within the first proportional time of every time slot.

11. The apparatus according to claim 10, wherein the controller controls the data transmission between the buffer memory circuit and the processor within the second proportional time of a time slot in a direction opposite to the direction of the data transmission within the first proportional time of the same time slot.

12. The apparatus according to claim 11, wherein when one of the two buffers of the first buffer memory or the second buffer memory is in operation, the other buffer is still able to receive other data.

13. The apparatus according to claim 12, wherein when the controller has completed data transmission between the first buffer memory and the processor or between the second buffer memory and the processor; the first buffer memory or the second buffer memory correspondingly receives the data read or written by an external host via the host interface.

14. The apparatus according to claim 12, wherein, if the second data has been transmitted completely between one of the buffers of the second buffer memory and the host interface within the first proportional time of the first time slot, the other buffer of the second buffer memory accepts an external host to read or write data via the host interface.

15. The apparatus according claim 14, wherein the external host completes reading or writing data to the other buffer of the second buffer memory via the host interface within the second time slot.

16. The apparatus according to claim 12, wherein, if the third data has been transmitted completely between one of the buffers of the first buffer memory and the host interface within the first proportional time of the second time slot, the other buffer of the first buffer memory accepts an external host to read or write data via the host interface.

17. The apparatus according to claim 16, wherein when the third data has been transmitted between one of the buffers of the first buffer memory and the host interface within the first proportional time of the second time slot, the controller controls the buffer of the first buffer memory to transmit the third data to the processor within a third time slot, and which then transmits the third data to another RF signal processing apparatus.

18. The apparatus according to claim 8, wherein the controller controls the first buffer memory to permit an external host to access the first data in one of the buffers within the second proportional time of the first time slot.

19. The apparatus according to claim 18, wherein, if the external host does not complete accessing the first data within the second proportional time of the first time slot, the external host goes on to access the first data until the first data has been accessed within the first proportional time of the second time slot.

20. The apparatus according to claim 19, wherein the two buffers of the first buffer memory are a first receive buffer and a first transmission buffer; and the two buffers of the second buffer memory are a second receive buffer and a second transmission buffer.

* * * * *